United States Patent [19]
Gisslen

[11] 3,892,358
[45] July 1, 1975

[54] NOZZLE SEAL

[75] Inventor: Jan M. Gisslen, Cincinnati, Ohio

[73] Assignee: General Electric Company, Cincinnati, Ohio

[22] Filed: Mar. 17, 1971

[21] Appl. No.: 125,277

[52] U.S. Cl.................... 239/265.39; 239/265.43
[51] Int. Cl. ........................................ B64c 15/02
[58] Field of Search..... 239/265.19, 265.33, 265.39, 239/265.43

[56] References Cited
UNITED STATES PATENTS

| | | | |
|---|---|---|---|
| 2,634,578 | 4/1953 | Kallal | 239/265.39 |
| 2,974,480 | 3/1961 | Kurtl | 239/265.39 |
| 3,249,306 | 5/1966 | Altseimer | 239/265.43 X |

FOREIGN PATENTS OR APPLICATIONS

| | | | |
|---|---|---|---|
| 984,925 | 3/1965 | United Kingdom | 239/265.33 |

Primary Examiner—M. Henson Wood, Jr.
Assistant Examiner—Michael Mar
Attorney, Agent, or Firm—Lee H. Sachs; Derek P. Lawrence

[57] ABSTRACT

Seal means are provided for a variable area flap nozzle of the type having an annular array of axially extending flaps hinged at their upstream ends to a duct defining structure. An annular band provides a seal at the flap hinge point and strips provide a seal between peripherally adjacent flaps. The band and strips include a preformed flex loop to enable unrestrained movement of the flaps throughout the desired area range of the nozzle.

4 Claims, 5 Drawing Figures

INVENTOR.
JAN M. GISSLEN

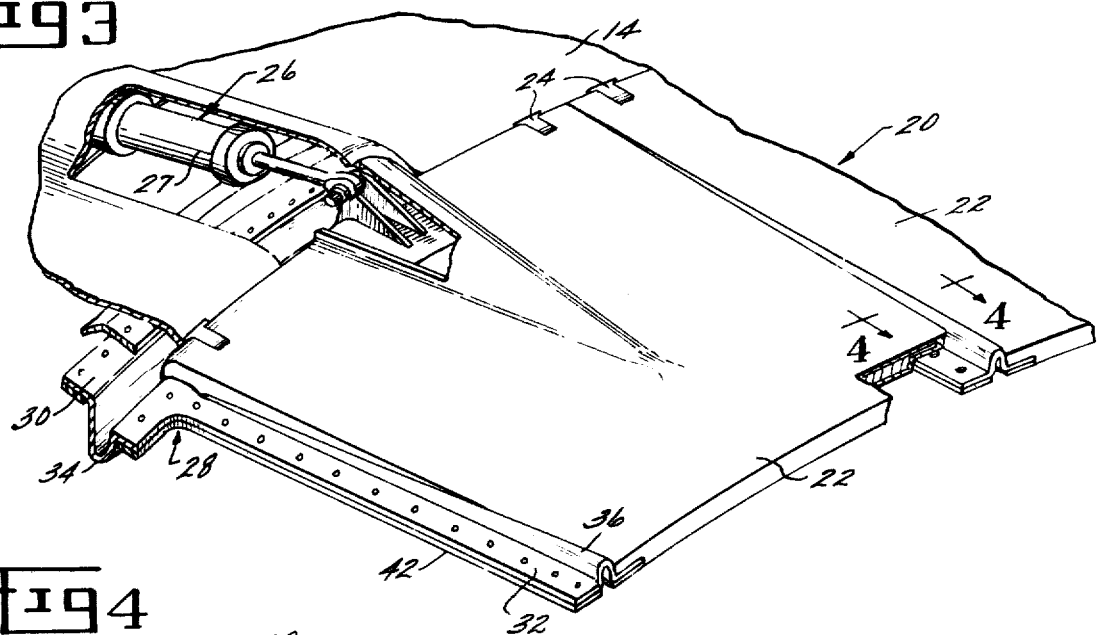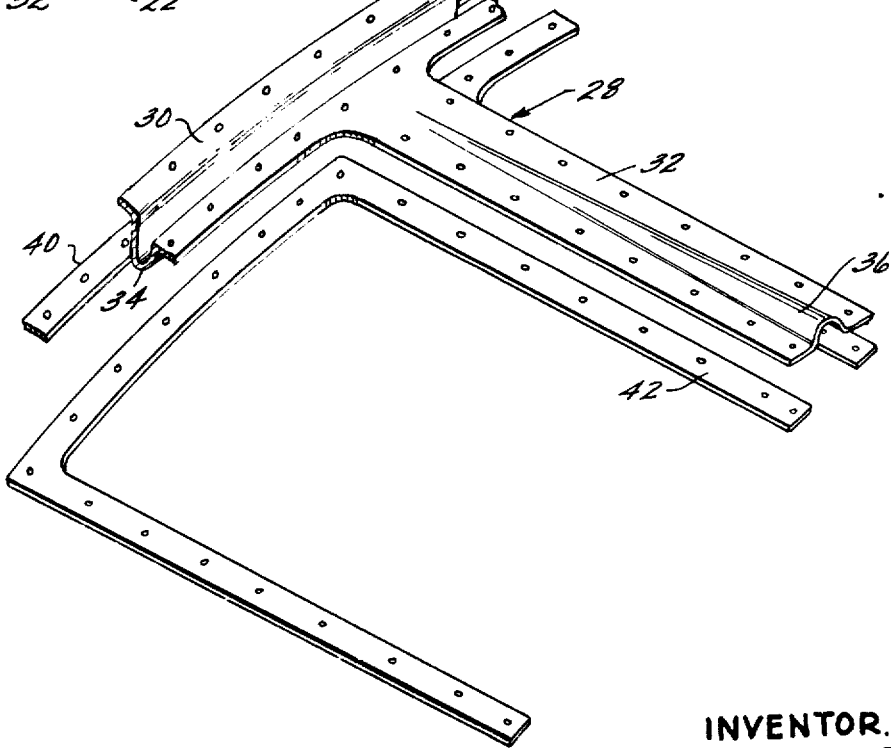

NOZZLE SEAL

This invention relates to aircraft gas turbine engines and, more particularly, to variable area exhaust nozzles therefor.

In aircraft gas turbine engines it is often necessary or desirable to provide a variable area exhaust nozzle to enhance performance during various modes of engine operation such as take-off, cruise or climb. Such variable area nozzles generally comprise an annular array of flaps which are hinged at their upstream or forward ends and are free to pivot radially in unison at their downstream ends to permit the desired nozzzle area variation. In order to prevent fluid leakage through the nozzle which would result in a thrust and efficiency loss, a seal is generally provided between the peripherally adjacent flaps, and between the flaps and their supporting structure at the hinge connection.

The interflap seal has in the past been commonly formed by providing loose spacers that overlap peripherally adjacent flaps or by sizing the flaps themselves to overlap throughout the desired range of flap movement. Such sliding contact seals, however, generally require precision machined parts and are subject to wear and some leakage due to normal tolerance variations in the flaps and spacers. In addition, such sliding seals are leakage sensitive to any bending or buckling which may occur during use.

A primary object of this invention, then, is to provide sealing means for a variable area flap nozzle which is of simple and economical construction and which greatly reduces or eliminates seal leakage.

Briefly, the above and other objects, which will become apparent upon reading the following description of the preferred embodiment, are achieved in the present invention by providing an annular band having a preformed flexible fold or flex loop intermediate the portion of the band which is secured to the engine supporting structure and the portion of the band which is secured to the nozzle flaps, to thereby provide a seal at the flap hinge connection without inhibiting flap movement, together with an axial strip for each pair of adjacent flaps. Each strip is secured along its length to its respective flaps and is formed with a flexible fold or flex loop which extends between its respective pair of flaps and is sized and formed so as to permit the desired flap movement.

While the specification concludes with claims particularly pointing out and distinctly claiming the subject matter of this invention, it is believed that the invention will be better understood upon reading the following description of the preferred embodiment in conjunction with the accompanying drawings wherein:

FIG. 3 is a partial perspective view, in partial section, showing the variable area nozzle of FIG. 2;

FIG. 4 is a cross-sectional view taken along lines 4—4 of FIG. 3, and

FIG. 5 is an exploded perspective view showing one embodiment of the present invention.

Figure 1:
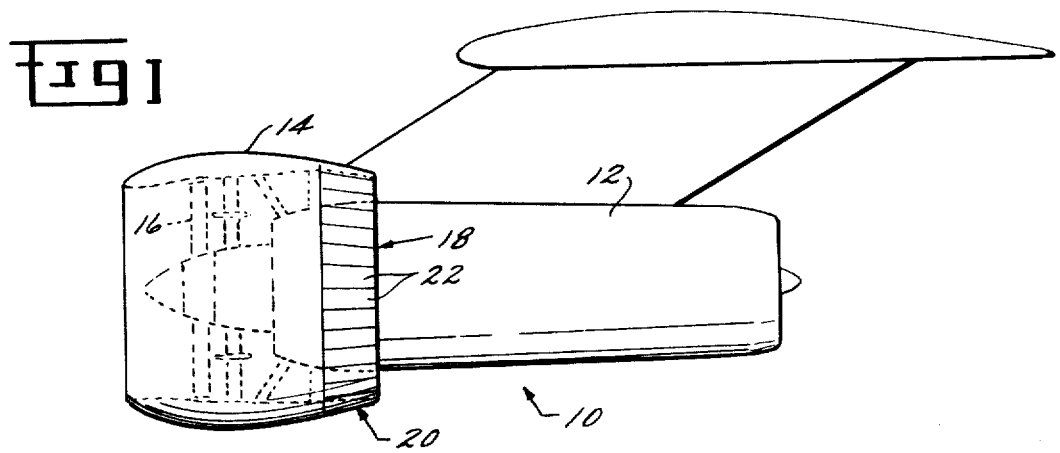
FIG. 1 is a side elevational view of the gas turbine engine embodying the present invention.

With reference now to FIG. 1, a turbofan engine has been shown generally at 10 and includes a core engine nacelle 12 and a fan duct 14. As will be understood, a core engine or gas generator (not shown) and a fan turbine (not shown), both of well-known construction, are disposed within the nacelle 12 with the fan turbine operatively connected to a fan 16 disposed within the duct 14. An outlet 18 for the duct 14 is defined intermediate the core nacelle 12 and a variable area nozzle 20 which is secured to the downstream end of the duct 14. As will be understood, in operation air is pressurized by the fan 16 and discharged through outlet 18 to produce propulsive thrust for the engine 10.

Figure 2:
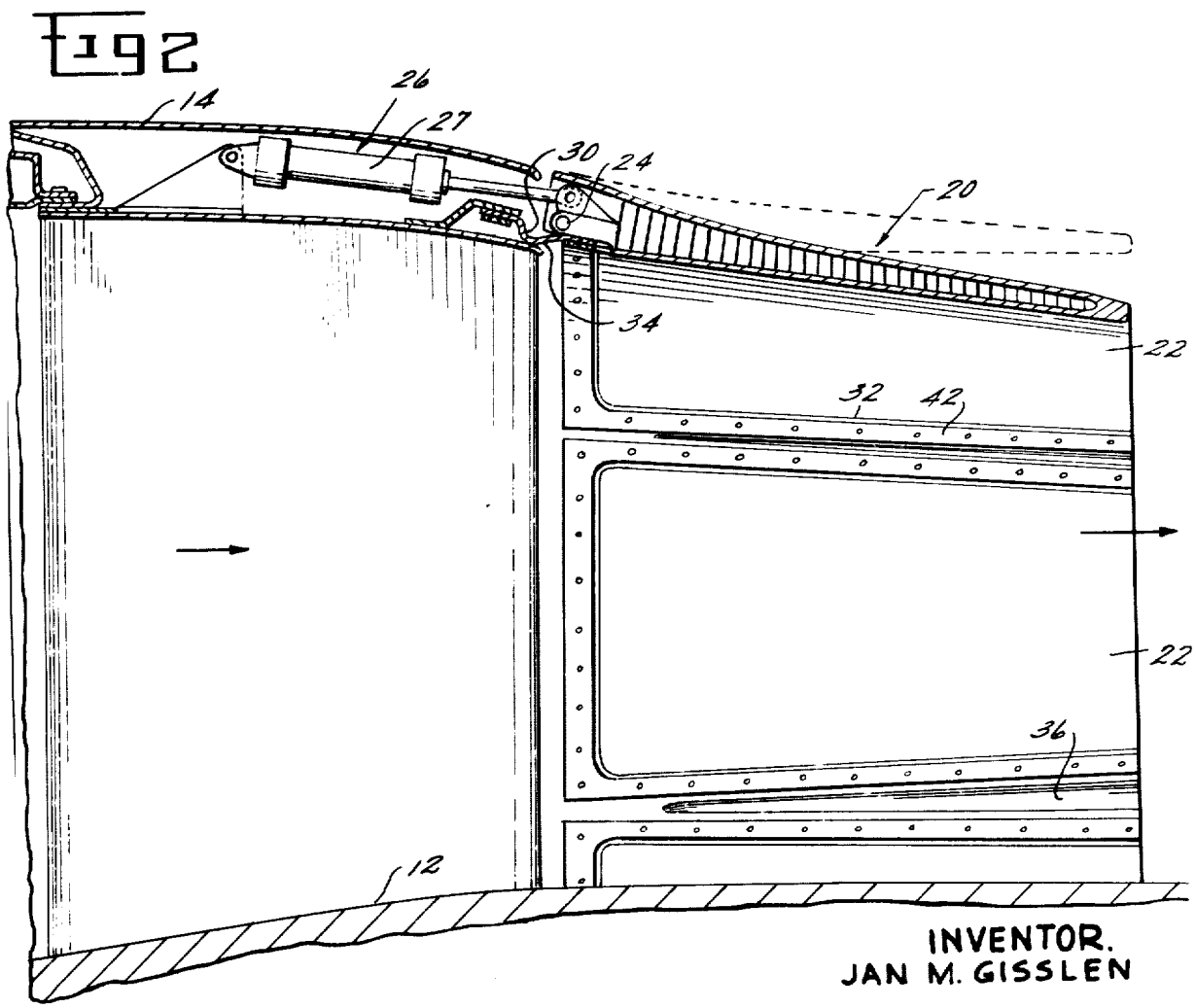
FIG. 2 is a partial cross-sectional view, drawn to an enlarged scale, showing the variable area nozzle of the engine of FIG. 1.

As shown in FIGS. 1 – 3, the variable area nozzle 20 comprises an annular array of generally axially extending flaps 22 which are hingeably connected, as at 24, to the duct 14 for pivotal radial inward and outward movement.

Suitable actuator means 26 are provided to enable selective positioning of the flaps 22 to increase or decrease the cross-sectional flow area of the outlet 18. The actuator means employed may be widely varied and may include a plurality of actuators 27, of the pressure-responsive or ball/screw type, which are pivotally connected between the flaps 22 and the duct 14 as shown in FIG. 2.

In accordance with the present invention, seal means for preventing leakage of the fan pressurized air or the motive fluid at the flap hinge connections 24 and between peripherally adjacent flaps 22 have been shown at 28 in FIGS. 2 – 5 as comprising a circumferential band 30 and a plurality of generally axially extending strips 32.

The circumferential band 30 includes a generally centrally disposed, molded, circumferentially extending flexible portion or flex loop 34, and is secured on either side of the flex loop 34 to the duct 14 and the flaps 22. Likewise, each strip 32 includes a molded or preformed flexible portion or flex loop 36 which projects radially outwardly and increases in radial height to the downstream end 38 of the strip 32.

As best shown in FIGS. 3 and 4, each respective strip 32 is suitably secured along its length to a pair of peripherally adjacent flaps 22 so that the flex loop 36 projects radially outwardly between the flaps.

The seal means 28 may be conveniently secured to the aft edge of the duct 14 and the leading and peripheral edges of the flaps 22 using variously configured retaining strips, as at 40 and 42, which are secured to the flaps 22 or the duct 14 by suitable fasteners, such as rivets, bolts, or the like, to tightly compress the seal means against and into sealing abutment with such members.

As will be understood, in application the seal means 28 may take on a variety of configurations. For example, while it is preferable that the strips 32 be formed integrally with the circumferential band 30 as shown in FIG. 5, they may be formed separately and butted tightly against the band 30 during installation. Where the strips 32 are formed integrally with the band 30 it is preferable that the seal be formed as one continuous strip. The retaining strips 42 may be formed as U-sections as shown in FIG. 5, as L-sections or simply as a plurality of straight strips and may be separate from or molded into the seal means 28.

The seal means 28 may be formed by any suitable means such as molding using any suitable flexible material having the strength and temperature characteristics which may be required for the application. For example, the seal means 28 may be formed using silicone or neoprene rubber which may be suitably reinforced using nylon, glass fiber or wire.

The flex loops 34 and 36 are sized to permit the movement of each flap from the desired closed position, as shown in FIGS. 2 and 3, to the desired open position of the nozzle as shown in FIG. 4 and in phantom in FIG. 2.

Since the seal means 28 of this invention is flexible and will conform to the shape of each flap 22 and the portion of duct 14 against which the seal abuts, the present invention alleviates the requirement for maintaining close tolerances as is required in the case of sliding seals, and enhances sealing effectiveness.

While the invention has been depicted and described in connection with a fan duct nozzle and is particularly applicable thereto because of the relatively low pressures and temperatures encountered within such a duct, it will be recognized that the invention is not limited thereto and may be effectively employed in core engine nozzles and confluent flow turbofan nozzles.

While a single embodiment of the present invention has been depicted and described, it will be appreciated that such is intended to be exemplary only and not definitive and that many suitable additions, changes or modifications may be made thereto without departing from the fundamental theme of the invention.

What is claimed is:

1. A variable area nozzle for a gas turbine engine of the type adapted to generate propulsive thrust by producing a motive fluid stream and effluxing same from a passage of said engine, said nozzle comprising:

a plurality of flaps arranged in an annular array and hingeably connected to a supportive portion of said engine so as to define a downstream extension of and an outlet for said motive fluid passage;

means for pivoting each said flap about its hinge connection to vary the cross-sectional area of said outlet; and seal means for preventing motive fluid leakage between peripherally adjacent ones of said flaps and at said hinge connections, said seal means comprising means forming a plurality of axial strips and an annular band having a preformed flex loop, said band secured on one side of said flex loop to said supportive engine portion and on the other side of said flex loop to said flaps, each said strip having a preformed flex loop and secured along its length to a respective pair of flaps with said flex loop disposed between said flaps, said flex loops sized to permit the desired pivotal movement of the flaps.

2. The structure of claim 1 further characterized in that said strips are integrally formed with said annular band forming means.

3. The structure of claim 1 further characterized in that said band is secured to said supportive engine portion and said flaps radially inwardly of said hinge connection.

4. The structure of claim 1 further characterized in that the flex loop of each said strip projects radially outwardly between its respective pair of flaps.

* * * * *